United States Patent
Yu et al.

(10) Patent No.: US 8,693,809 B2
(45) Date of Patent: Apr. 8, 2014

(54) VIDEO PROCESSING METHOD AND CIRCUIT USING THEREOF

(75) Inventors: Chia-Wei Yu, Taipei (TW); Chia-Yu Yang, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 277 days.

(21) Appl. No.: 13/223,661

(22) Filed: Sep. 1, 2011

(65) Prior Publication Data

US 2012/0057074 A1 Mar. 8, 2012

(30) Foreign Application Priority Data

Sep. 7, 2010 (TW) ................................ 99130246 A

(51) Int. Cl.
*G06K 9/32* (2006.01)
*H04N 7/01* (2006.01)

(52) U.S. Cl.
USPC .......................................... 382/298; 348/441

(58) Field of Classification Search
USPC ......... 382/254, 263–264, 266, 284, 298–300, 382/305, 312; 348/441, 581, 625, 222.1, 348/630; 345/660, 665
See application file for complete search history.

(56) References Cited

U.S. PATENT DOCUMENTS

| | | | |
|---|---|---|---|
| 4,972,256 A | | 11/1990 | Hirosawa et al. |
| 5,327,257 A | * | 7/1994 | Hrytzak et al. ............... 358/447 |
| 6,642,962 B1 | * | 11/2003 | Lin et al. ...................... 348/252 |
| 7,466,871 B2 | * | 12/2008 | Hosoda et al. ............... 382/266 |
| 7,483,058 B1 | * | 1/2009 | Frank et al. ................ 348/222.1 |
| 7,782,401 B1 | * | 8/2010 | Chou ............................ 348/581 |
| 7,957,611 B2 | * | 6/2011 | Zhu et al. ..................... 382/300 |

* cited by examiner

*Primary Examiner* — Kanjibhai Patel
(74) *Attorney, Agent, or Firm* — McClure, Qualey & Rodack, LLP

(57) ABSTRACT

A video processing method enlarging and enhancing sharpness of input video data includes following steps. First, N sets of pixel row data of the input video data are respectively buffered in N linear buffers, N is a natural number. Next, I sets of enlarged pixel row data are generated by interpolation according to the buffered N sets of pixel row data in the N linear buffers and a currently inputted set of pixel row data, I is a natural number greater than N. Then, I sets of smoothed and enlarged pixel row data are generated according to the buffered N sets of pixel row data in the N linear buffers and the $(N+1)^{th}$ set of pixel row data. Thereafter, I sets of sharpness-enhanced pixel row data are obtained according to the I sets of enlarged pixel row data and the I sets of smoothed and enlarged pixel row data.

12 Claims, 7 Drawing Sheets

VIDEO PROCESSING METHOD AND CIRCUIT USING THEREOF

This application claims the benefit of Taiwan application Serial No. 099130246, filed Sep. 7, 2010, the subject matter of which is incorporated herein by reference.

BACKGROUND OF THE INVENTION

1. Field of the Invention

The invention relates in general to a video processing circuit, and more particularly to a video processing circuit for performing a video enlarging operation and a video smoothing operation according to the buffered pixel data in the same linear buffer.

2. Description of the Related Art

In the existing art, a video sharpness enhancing circuit has existed and been widely applied to various video processing occasions. Generally speaking, the video sharpness enhancing circuit extracts high-frequency components from the original video, and superimposes the extracted high-frequency video components back onto the original video to achieve the technological effect of enhancing the video sharpness of the original video. However, the existing video sharpness enhancing technique needs to use a lot of linear buffers for buffering the original video so that the operation of calculating the high-frequency video components can be finished. Thus, it is an important subject in the industry to design a video processing circuit capable of performing a video sharpness-enhancement operation using fewer linear buffers.

SUMMARY OF THE INVENTION

The invention is directed to a video processing circuit using a video scaling circuit and a video smoothing circuit, disposed in parallel, to respectively finish the video enlarging operation and the video enlarging and smoothing operation according to buffered original video data in the same linear buffer. The video processing circuit of the invention further utilizes the blending circuit to obtain the high-frequency component data and the sharpness-enhanced pixel row data according to the enlarged video data and the enlarged and smoothed video data. Thus, compared with the conventional video sharpness enhancing circuit, the video processing circuit of the invention has the advantages of using the fewer linear buffers and having the lower cost.

According to a first aspect of the present invention, a video processing circuit for enlarging and enhancing sharpness of input video data is provided. The video processing circuit includes N linear buffers, a video scaling circuit, a video smoothing circuit and a blending circuit. The N linear buffers respectively buffer N sets of pixel row data of the input video data, wherein N is a natural number. The video scaling circuit generates I sets of enlarged pixel row data by means of interpolation according to the buffered N sets of pixel row data in the N linear buffers and a currently inputted $(N+1)^{th}$ set of pixel row data, wherein I is a natural number greater than N. The video smoothing circuit generates I sets of smoothed and enlarged pixel row data according to the buffered N sets of pixel row data in the N linear buffers and the $(N+1)^{th}$ set of pixel row data. The blending circuit obtains I sets of high-frequency pixel row data according to the I sets of enlarged pixel row data and the I sets of smoothed and enlarged pixel row data, and obtains I sets of sharpness-enhanced pixel row data by means of blending according to the I sets of enlarged pixel row data and the I sets of high-frequency pixel row data.

According to a second aspect of the present invention, a video processing method for enlarging and enhancing sharpness of input video data is provided. The video processing method includes the following steps. First, N sets of pixel row data of the input video data are respectively buffered in N linear buffers, wherein N is a natural number. Next, I sets of enlarged pixel row data are generated by means of interpolation according to the buffered N sets of pixel row data in the N linear buffers and a currently inputted $(N+1)^{th}$ set of pixel row data, wherein I is a natural number greater than N. Then, I sets of smoothed and enlarged pixel row data are generated according to the buffered N sets of pixel row data in the N linear buffers and the $(N+1)^{th}$ set of pixel row data. Next, I rows of sharpness-enhanced pixel data are obtained by means of blending according to the I sets of enlarged pixel row data and the I sets of smoothed and enlarged pixel row data.

The above and other aspects of the invention will become better understood with regard to the following detailed description of the preferred but non-limiting embodiment(s). The following description is made with reference to the accompanying drawings.

DETAILED DESCRIPTION OF THE INVENTION

The video processing circuit according to the embodiment of the invention uses a video scaling circuit and a smoothing circuit, which may share linear buffers, to obtain the high-frequency video data.

Figure 1:
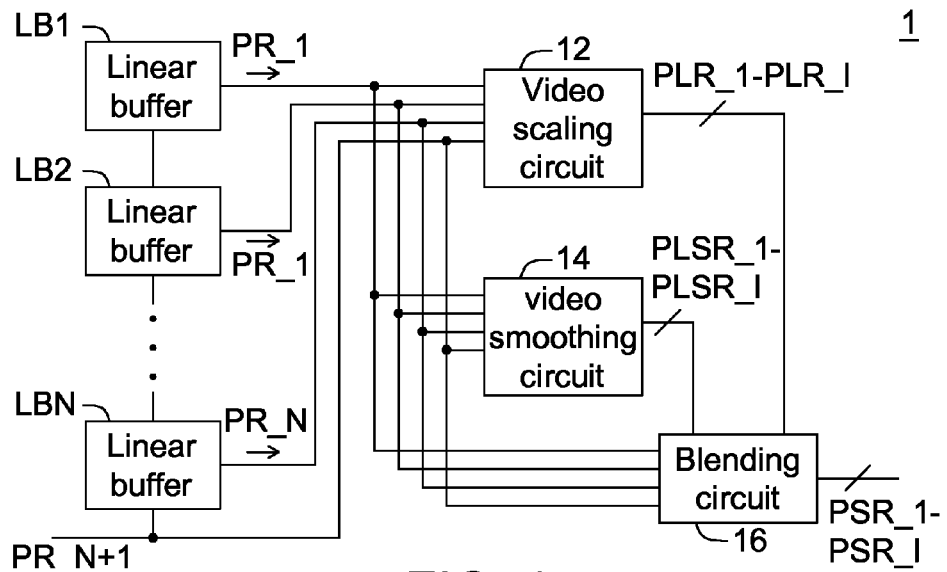
FIG. 1 is a block diagram showing a video processing circuit according to an embodiment of the invention.

FIG. 1 is a block diagram showing a video processing circuit 1 according to an embodiment of the invention. The video processing circuit 1 is for enlarging and enhancing sharpness of the input video data. For example, the input video data includes multiple sets of pixel row data, each of which includes multiple sets of pixel data, which are sequentially inputted. The video processing circuit 1 includes N linear buffers LB1, LB2, ..., LBN, a video scaling circuit 12, a video smoothing circuit 14 and a blending circuit 16, wherein N is a natural number.

The linear buffers LB1 to LBN buffer continuous N sets of pixel row data PR_1, PR_2, ..., PR_N of the input video data so that the video scaling circuit 12, the video smoothing circuit 14 and the blending circuit 16 perform the corresponding operations, wherein each of the N sets of pixel row data PR_1 to PR_N includes M sets of pixel data, wherein M is a natural number greater than 1. For example, at one operation time point, the video processing circuit 1 receives one set of currently inputted pixel row data PR_N+1, and the linear buffer sequentially buffers previous N sets of pixel row data PR_N, PR_N-1, PR_N-2 . . . , PR_1. In one operation example, N is equal to 5, and the currently inputted pixel row data PR_N+1 corresponds to the sixth pixel row data of the input video data. Thus, pixel row data stored in the linear buffers LB1 to LBN (N=5) respectively correspond to the first to fifth sets of pixel row data of the input video data.

Figure 2:
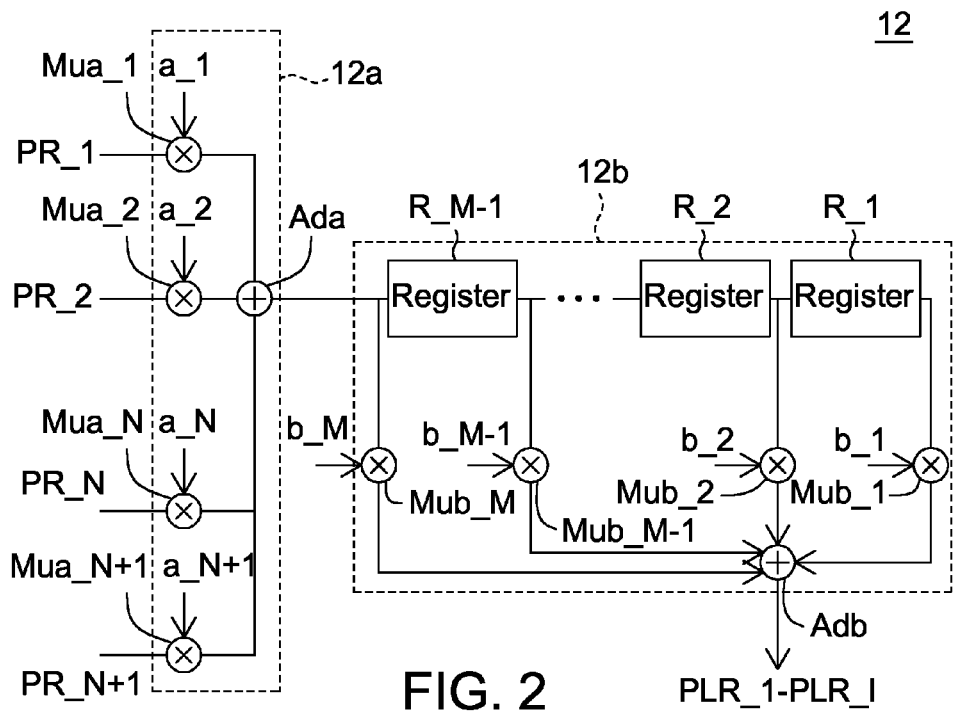
FIG. 2 is a detailed block diagram showing a video scaling circuit 12 of FIG. 1.

FIG. 2 is a detailed block diagram showing the video scaling circuit 12 of FIG. 1. As shown in FIG. 2, the video scaling circuit 12 obtains I sets of enlarged pixel row data PLR_1, PLR_2, . . . , PLR_I, according to the pixel row data PR_1 to PR_N, buffered in the linear buffers LB1 to LBN, and the (N+1)$^{th}$ set of pixel row data PR_N+1, wherein I is a natural number greater than (N+1). For example, the video scaling circuit 12 includes a vertical interpolation unit 12a and a horizontal interpolation unit 12b.

The vertical interpolation unit 12a performs a vertical interpolation operation according to the pixel row data PR_1 to PR_N+1 to generate I sets of vertically enlarged pixel row data. For example, the vertical interpolation unit 12a includes multipliers Mua_1, Mua_2, . . . , Mua_N+1 and an adder Ada for performing a weighting coefficient addition on the pixel row data PR_1 to PR_N+1 according to weighting parameters a_1, a_2, . . . , a_N+1 to implement the vertical interpolation operation. In one operation example, the values I and (N+1) satisfy: I=3×(N+1). In other words, the vertical interpolation unit 12a obtains three sets of vertical enlarged pixel row data by means of interpolation according to any two sets of pixel row data in the pixel row data PR_1 to PR_N+1.

The horizontal interpolation unit 12b performs a horizontal interpolation operation according to each of the I sets of vertically enlarged pixel row data to obtain the corresponding J sets of enlarged pixel data within each of the I sets of enlarged pixel row data PLR_1 to PLR_I according to the M sets of pixel data in each of the I sets of vertically enlarged pixel row data, wherein J is a natural number greater than M. For example, the horizontal interpolation unit 12b includes registers R_1, R_2, . . . , R_M-1 for storing first to (M-1)$^{th}$ sets of pixel data in each of the sets of the vertically enlarged pixel row data. The horizontal interpolation unit 12b further includes multipliers Mub_1, Mub_2, . . . , Mub_M and an adder Adb for performing the weighting coefficient addition on each of the vertically enlarged pixel row data according to the weighting parameters b_1, b_2, . . . , b_M to implement the horizontal interpolation operation. In one operation example, the values M and J satisfy: J=3×M. In other words, the horizontal interpolation unit 12b obtains three sets of enlarged pixel data by means of interpolation according to any two neighboring pixel data in each of the I sets of vertical enlarged pixel row data. Thus, the video scaling circuit 12 can provide the I sets of enlarged pixel row data PLR_1, PLR_2, . . . , PLR_I, each of which includes J sets of pixel data.

The video smoothing circuit 14 generates I sets of smoothed and enlarged pixel row data PLSR_1, PLSR_2, . . . , PLSR_I according to the buffered N sets of pixel row data PR_1 to PR_N in the linear buffers LB1 to LBN and the (N+1)$^{th}$ set of pixel row data PR_N+1. For example, the video smoothing circuit 14 includes (N-1) vertical smoothing units, M horizontal smoothing units, a vertical interpolation unit, a horizontal interpolation unit and multiple registers. In the following example, the operation of each unit in the video smoothing circuit 14 will be further described.

Figure 3:
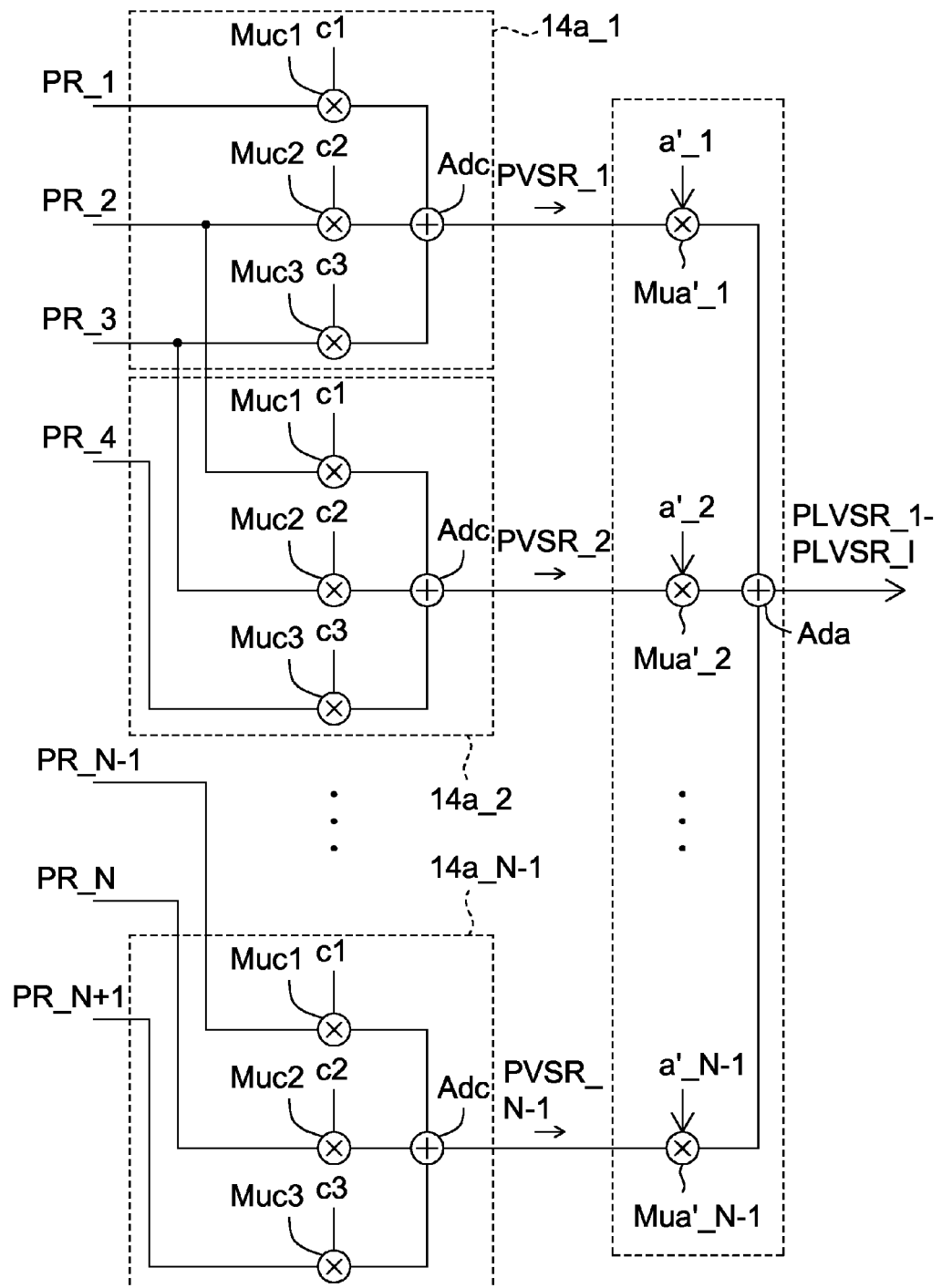
FIG. 3 is detailed block diagram showing vertical smoothing units and vertical interpolation units of a video smoothing circuit 14 according to the embodiment of the invention.

FIG. 3 is detailed block diagram showing vertical smoothing units and vertical interpolation units of the video smoothing circuit 14 according to the embodiment of the invention. As shown in FIG. 3, each of N vertical smoothing units 14a_1, 14a_2, . . . , 14a_N-1 generates vertically smoothed pixel row data PVSR_1, PVSR_2, . . . , PVSR_N-1 according to corresponding X sets of pixel row data in the (N+1) sets of pixel row data PR_1 to PR_N+1, wherein X is a natural number greater than 1. For example, each of the (N-1) vertical smoothing units 14a_1-14a_N-1 includes X multipliers Muc1, Muc2, . . . , MucX and an adder Adc for performing the weighting coefficient addition on each of the corresponding sets of pixel row data according to the corresponding X sets of weighting parameters to implement the vertical smoothing operation. For example, the value X is equal to 3, and the vertical smoothing units 14a_1 to 14a_N-1 generate the corresponding vertically smoothed pixel row data PVSR_1 to PVSR_N-1 according to the corresponding three sets of pixel row data PR_1 to PR_3, PR_2 to PR_4, PR_3 to PR_5, . . . , PR_N-1 to PR_N+1, respectively.

The vertical interpolation unit 14c, having the operation similar to the vertical interpolation unit 12a in the video scaling circuit 12, performs the vertical interpolation operation according to the vertically smoothed pixel row data PVSR_1 to PVSR_N-1 to generate I sets of vertically enlarged and smoothed pixel row data PLVSR_1, PLVSR_2, . . . , PLVSR_I. For example, the vertical interpolation unit 14c includes multipliers Mua'_1, Mua'_2, . . . , Mua'_N-1 and an adder Ad'a for performing the weighting coefficient addition according to the weighting parameters a'_1, a'_2, . . . , a'_N-1 on the corresponding each set of vertically smoothed pixel row data PVSR_1 to PVSR_N-1 to implement the vertical interpolation operation.

Figure 4:
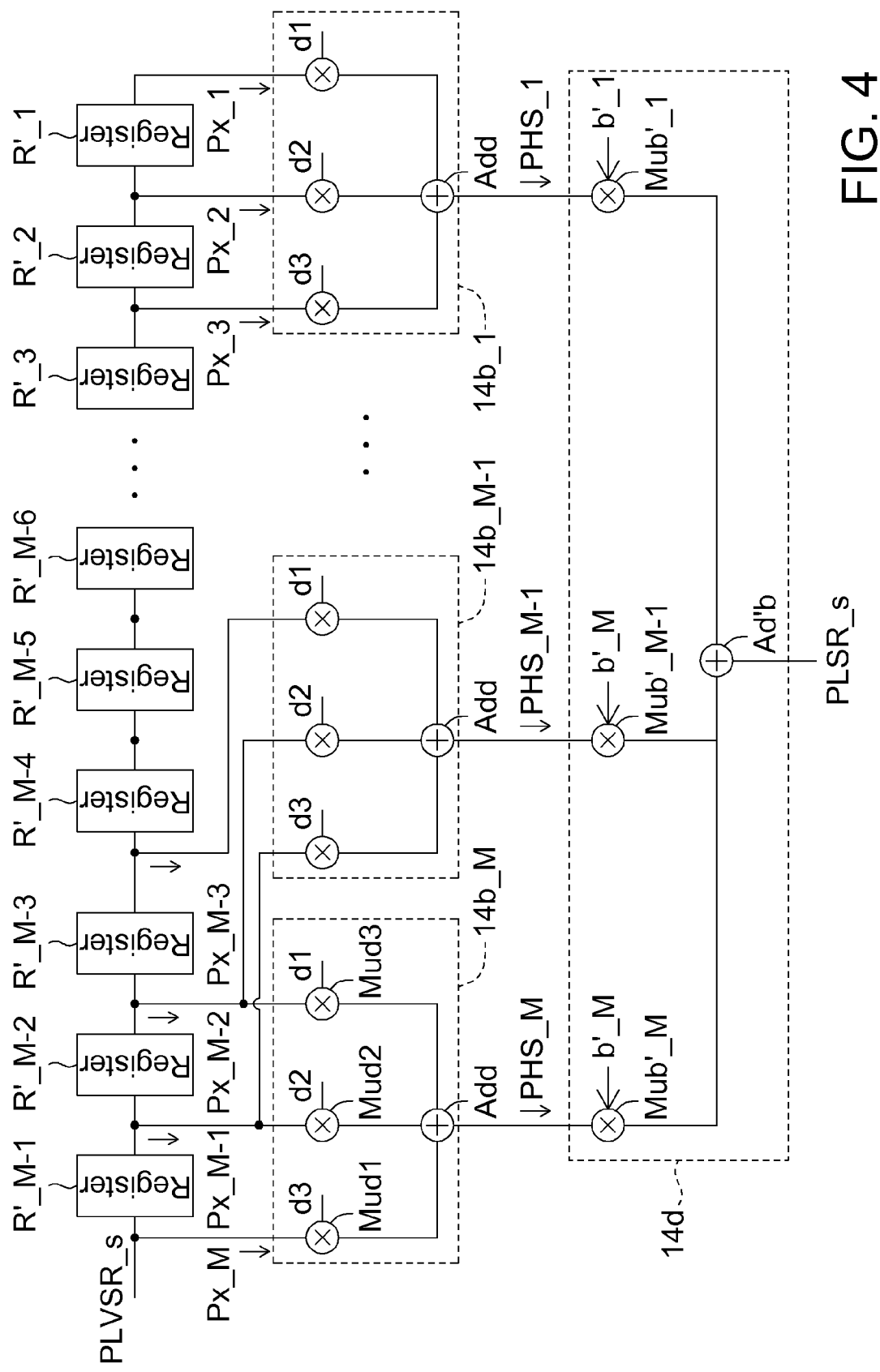
FIG. 4 is a detailed block diagram showing registers, horizontal smoothing units and horizontal interpolation units of the video smoothing circuit 14 according to the embodiment of the invention.

FIG. 4 is a detailed block diagram showing registers, horizontal smoothing units and horizontal interpolation units of the video smoothing circuit 14 according to the embodiment of the invention. For example, the video smoothing circuit 14 includes (M-1) registers R11, R'_2, . . . , R'_M-1, which respectively store (M-1) sets of pixel data in each of the I sets of vertically enlarged and smoothed pixel row data PLVSR_1 to PLVSR_I, and the M$^{th}$ set of pixel data in each of the I sets of vertically enlarged and smoothed pixel row data PLVSR_1 to PLVSR_I is the currently inputted pixel data. The horizontal smoothing unit and the horizontal interpolation unit perform the corresponding smoothing and interpolation operations according to the pixel data buffered in the registers R'1 to R'_M-1 and the currently inputted M$^{th}$ set of pixel data. Because the operations, performed by the registers R'_1 to R'_M-1, the horizontal smoothing unit and the horizontal interpolation unit on each of the I sets of vertically enlarged and smoothed pixel row data PLVSR_1 to PLVSR_I, are substantially the same, only the operation, performed by the circuit on the s$^{th}$ set of vertically enlarged and smoothed pixel row data PLVSR_s, will be described as an example to describe the operation of the circuit in detail, wherein s is a natural number smaller than or equal to I.

When the signal inputted to the registers R'1 to R'_M-1 is the vertically enlarged and smoothed pixel row data PLVSR_s, they respectively buffer the first, second to (M-1) sets of pixel data Px_1, Px_2, . . . , Px_M-1 in the vertically enlarged and smoothed pixel row data PLVSR_s, and the M$^{th}$ set of pixel data Px_M in the vertically enlarged and smoothed pixel row data PLVSR_s is stored to the register R'_M-1 at the next operation time.

Each of the M horizontal smoothing units 14b_1, 14b_2, ..., 14b_M generates one corresponding set of horizontally smoothed pixel data PHS_1, PHS_2, ..., PHS_M, according to the buffered Y sets of pixel data, wherein Y is a natural number greater than 1. For example, Y is equal to 3, and the $M^{th}$ horizontal smoothing unit 14b_M performs the smoothing operation according to the currently inputted $M^{th}$ set of pixel data Px_M, the buffered pixel data Px_M−1 and Px_M−Y+1 (i.e., Px_M−2) in the registers R'_M−1 and R'_M−Y+1 (i.e., R'_M−2), and accordingly generates the horizontally smoothed pixel data PHS_M. The remaining (M−1) horizontal smoothing units 14b_M−1 to 14b_1 perform the operations similar to those of the horizontal smoothing unit 14b_M, and detailed descriptions thereof will be omitted. For example, each of the horizontal smoothing units 14b_1 to 14b_M includes Y multipliers Mud1, Mud2, ..., MudY and an adder Add for performing the weighting coefficient addition on the each corresponding set of pixel data according to the corresponding Y sets of weighting parameters d1, d2, ..., dy (i.e., d3) to implement the horizontal smoothing operation. Though only the situation that the weighting parameters for each of the smooth units are labeled as weighting parameters d1-d3 in the present embodiment for the sake of illustration, the weighting parameters, in other embodiments, may have other kinds of value setting with vast kind of variation.

The horizontal interpolation unit 14d performs the horizontal interpolation operation according to M sets of horizontally smoothed pixel data PHS_1 to PHS_M to obtain J sets of enlarged and smoothed pixel data in the enlarged smoothed pixel row data PLVSR_s, and accordingly to determine the corresponding enlarged smoothed pixel row data. For example, the horizontal interpolation unit 14d, having the operation similar to the horizontal interpolation unit 12b in the video scaling circuit 12, performs the horizontal interpolation operation according to the horizontally smoothed pixel data PHS_1, PHS_2, ..., PHS_M to generate the J sets of horizontally enlarged and smoothed pixel data corresponding to the vertically enlarged and smoothed pixel row data PLVSR_s. The corresponding $s^{th}$ set of enlarged smoothed pixel row data PLSR_s includes the J sets of horizontally enlarged and smoothed pixel data. For example, the horizontal interpolation unit 14d includes multipliers Mub'_1, Mub'_2, ..., Mub'_M and an adder Ad'b for performing the weighting coefficient addition on the each of the corresponding sets of horizontally smoothed pixel data PHS_1 to PHS_M according to the weighting parameters b'_1, b'_2, ..., b'_M to implement the horizontal interpolation operation.

In the above-mentioned paragraphs, the operations of the above-mentioned circuits are described according to the example operations performed, by the registers R'1 to R'M, the horizontal smoothing units 14b1 to 14b_M and the horizontal interpolation unit 14d in the video smoothing circuit 14, on the $s^{th}$ set of vertically enlarged and smoothed pixel row data PLVSR_s. However, the operations performed, by the registers R'1 to R'M, the horizontal smoothing units 14b_1 to 14b_M and the horizontal interpolation unit 14d, on the other sets of vertically enlarged and smoothed pixel row data may be obtained similarly according to the descriptions in the paragraphs. Herein, the detailed descriptions thereof will be omitted. Accordingly, the video smoothing circuit 14 can obtain I sets of smoothed and enlarged pixel row data PLSR_1 to PLSR_I.

The blending circuit 16 obtains I sets of high-frequency pixel row data PHP_1, PHP_2, ..., PHP_I according to the I sets of enlarged pixel row data PLR_1 to PLR_I and the I sets of smoothed and enlarged pixel row data PLSR_1 to PLSR_I, and obtains I rows of sharpness-enhanced pixel data PSR_1, PSR_2, ..., PSR_I by means of blending according to the I sets of enlarged pixel row data PLR_1 to PLR_I and the corresponding I sets of high-frequency pixel row data PHP_1 to PHP_I. The high-frequency pixel row data PHP_1 to PHP_I respectively indicate the high-frequency components of the I sets of enlarged pixel row data PLR_1 to PLR_I, that is, the information corresponding to the edge of the object in the video. The sharpness-enhanced pixel row data PSR_1 to PSR_I, obtained according to the high-frequency pixel row data PHP_1 to PHP_I and the enlarged pixel row data PLR_1 to PLR_I, are the sharpness-enhanced pixel row data generated by superimposing the high-frequency pixel row data on the enlarged pixel row data.

Figure 5:
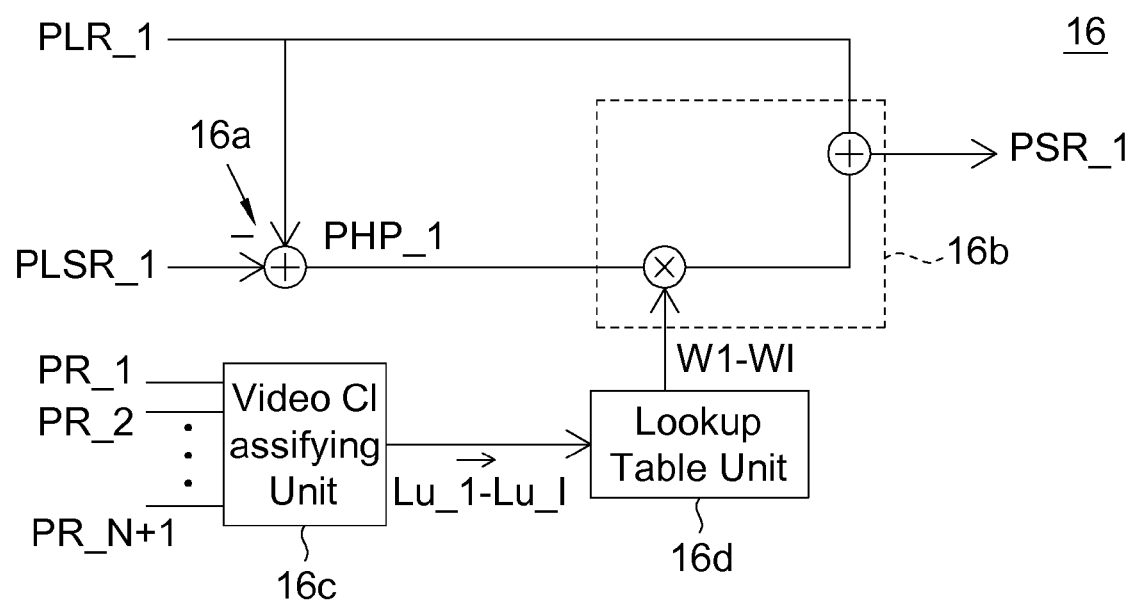
FIG. 5 is a detailed block diagram showing a blending circuit 16 of FIG. 1.

FIG. 5 is a detailed block diagram showing the blending circuit 16 of FIG. 1. Referring to FIG. 5, for example, the blending circuit 16 includes an operating unit 16a and a blending unit 16b. The operating unit 16a obtains the I sets of high-frequency pixel row data PHP_1 to PHP_I by means of subtraction according to the I sets of enlarged pixel row data PLR_1 to PLR_I and the corresponding I sets of smoothed and enlarged pixel row data PLSR_1 to PLSR_I. The blending unit 16b obtains I rows of sharpness-enhanced pixel data PSR_1 to PSR_I by means of blending, according to the I sets of sharpness weighting coefficients W1, W2, ..., WI, the I sets of high-frequency pixel row data PHP_1 to PHP_I and the corresponding I sets of enlarged pixel row data PLR_1 to PLR_I. For example, the blending unit 16b includes a multiplier for determining the weighting coefficients of the high-frequency pixel row data PHP_1 to PHP_I with respect to the corresponding enlarged pixel row data PLR_1 to PLR_I according to the corresponding sharpness weighting coefficients W1 to WI; and an adder for superimposing the high-frequency pixel row data PHP_1 to PHP_I, obtained after the weighting coefficients are adjusted, onto the corresponding enlarged pixel row data PLR_1 to PLR_I.

In one example, the blending circuit 16 further includes a video classifying unit 16c and a lookup table (LUT) unit 16d. The video classifying unit 16c judges whether each of the (N+1) sets of pixel row data PR_1 to PR_N+1 satisfies the video characteristic condition, and accordingly generates N sets of lookup table control signals Lu_1, Lu_2, ..., Lu_N. For example, the video classifying unit 16c determines a search window to select a portion of the pixel row data in the N sets of pixel row data PR_1 to PR_N+1, and the video characteristic condition is the condition regarding whether the selected pixel row data corresponds to the natural edge of the object. Accordingly, the video classifying unit 16c can classify the pixel row data PR_1 to PR_N+1 into at least a class corresponding to the natural edge and a class corresponding to the non-natural edge, and provide the control signals Lu_1 to Lu_N to respectively indicate the class of each of the pixel row data PR_1 to PR_N.

The lookup table unit 16d obtains the corresponding sharpness weighting coefficients W1 to WI in response to the control signals Lu_1 to Lu_N according to the lookup table. For example, in response to the control signal indicating that the corresponding pixel row data correspond to the natural-edge class, the lookup table correspondingly provides the sharpness weighting coefficient with the higher value to perform the high-frequency enhancement on the frame contents of the natural edge; and in response to the control signal indicating that the corresponding pixel row data correspond to the non-natural-edge class, the lookup table correspondingly provides the sharpness weighting coefficient with the lower value to prevent the over high-frequency enhancement, which affects the frame quality, from being performed on the non-edge content of the frame.

In one operation example, the video classifying unit 16c can adopt the difference between the pixel data, corresponding to the highest gray level and the lowest gray level, in the selected (N+1) sets of pixel row data to serve as the criterion, and thus judge whether the selected pixel row data correspond to the natural edge. When the difference is greater than or equal to a threshold value, the video classifying unit 16c judges the selected pixel row data as corresponding to the natural-edge class; and when the difference is smaller than the threshold value, the video classifying unit 16c judges the selected pixel row data as corresponding to the non-natural-edge class. In other examples, the video classifying unit 16c may further classify the corresponding classes according to other numerical features of the selected pixel row data.

Figure 6:
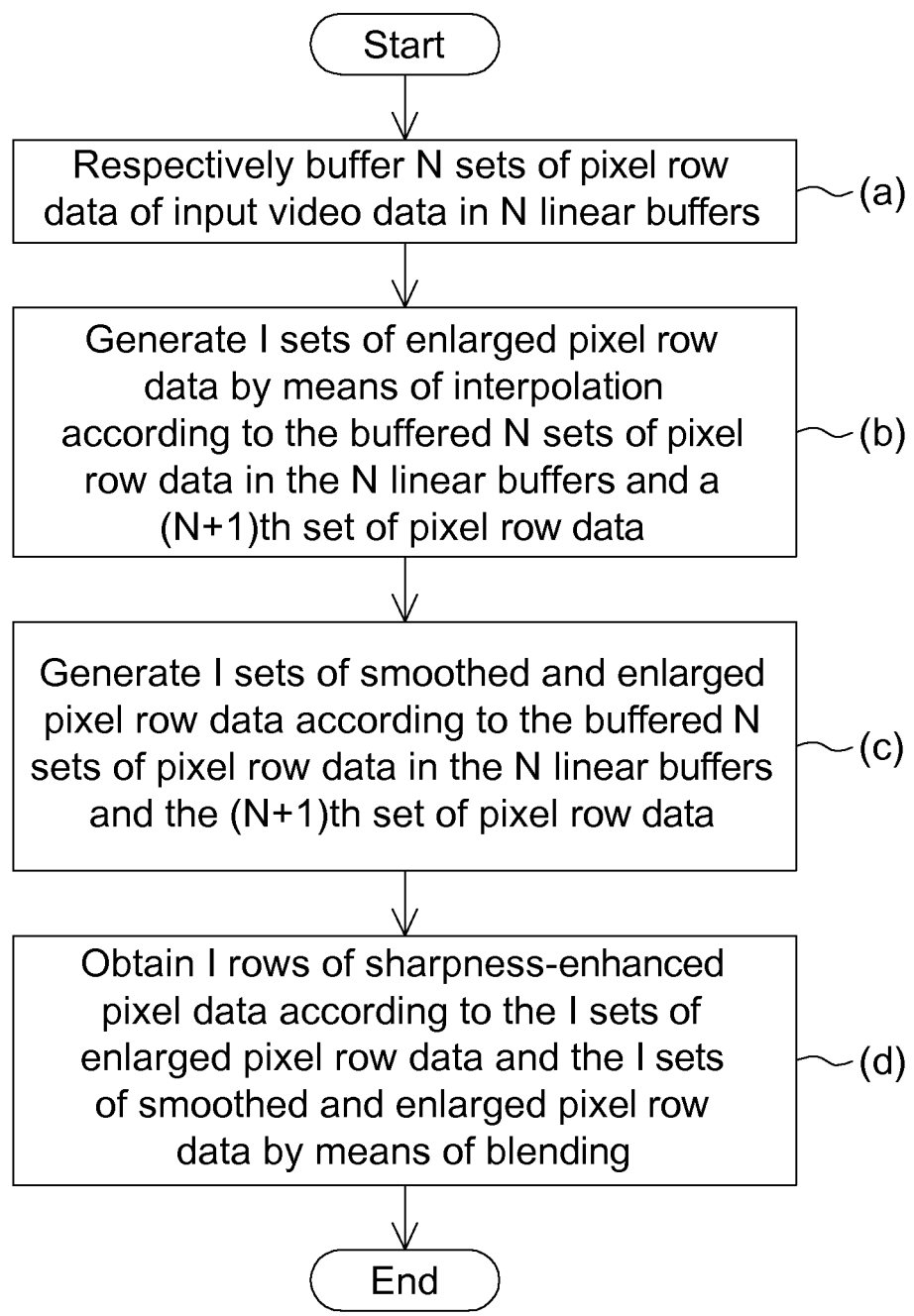
FIG. 6 is a flow chart showing a video processing method according to the embodiment of the invention.

FIG. 6 is a flow chart showing a video processing method according to the embodiment of the invention. Referring to FIG. 6, the video processing method includes the following steps. First, as shown in step (a), the linear buffers LB1 to LBN respectively buffer the N sets of pixel row data PR_1 to PR_N of the input video data in the N linear buffers LB1 to LBN. Next, as shown in step (b), the video scaling circuit 12 generates the I sets of enlarged pixel row data PLR_1 to PLR_I by means of interpolation according to the buffered N sets of pixel row data PR_1 to PR_N in the N linear buffers LB1 to LB_N and the currently inputted (N+1)$^{th}$ set of pixel row data PR_N+1.

Then, as shown in step (c), the video smoothing circuit 14 generates the I sets of smoothed and enlarged pixel row data PLSR_1 to PLSR_I according to the buffered N sets of pixel row data PR_1 to PR_N in the N linear buffers and the currently inputted (N+1)$^{th}$ set of pixel row data PR_N+1. Next, as shown in step (d), the blending circuit 16 obtains the I rows of sharpness-enhanced pixel data PSR_1 to PSR_I by means of blending according to the I sets of enlarged pixel row data PLR_1 to PLR_I and the I sets of smoothed and enlarged pixel row data PLSR_1 to PLSR_I.

Figure 7:
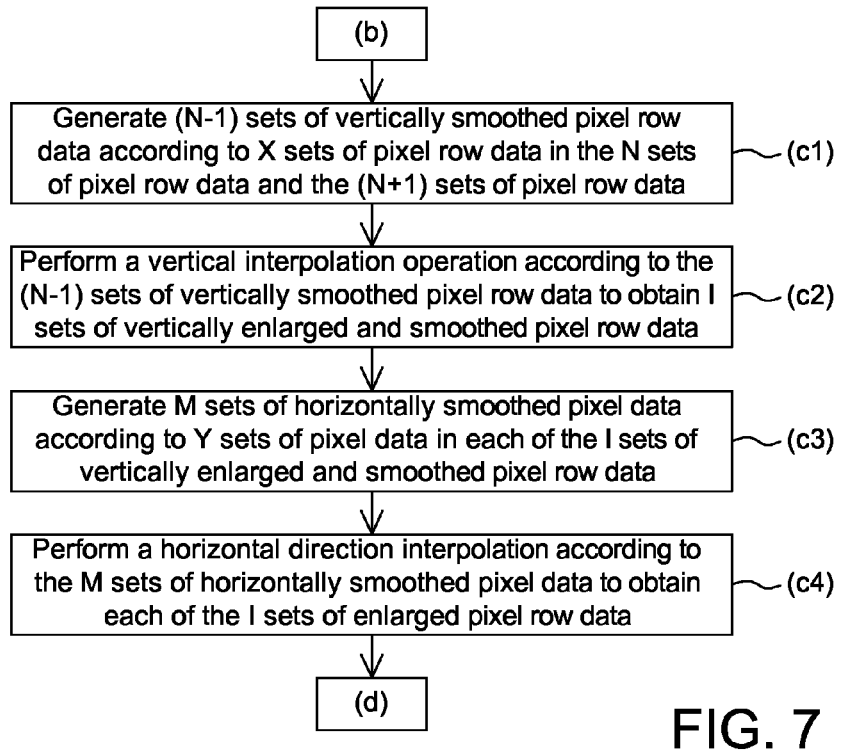
FIG. 7 is a detailed flow chart showing the step (c) in FIG. 6.

FIG. 7 is a detailed flow chart showing the step (c) in FIG. 6. For example, the step (c) includes steps (c1) to (c4). First, as shown in the step (c1), the (N−1) vertical smoothing units 14a_1 to 14a_N−1 generate (N−1) sets of vertically smoothed pixel row data PVSR_1 to PVSR_N−1 according to X sets of pixel row data in the (N+1) sets of pixel row data RP_1 to PR_N+1. Next, as shown in the step (c2), the vertical interpolation unit 14c performs the vertical interpolation operation according to N sets of vertically smoothed pixel row data PVSR_1 to PVSR_N−1 to obtain the I sets of vertically enlarged and smoothed pixel row data PLVSR_1 to PLVSR_I.

Then, as shown in the step (c3), the M horizontal smoothing units 14b_1 to 14b_M generate M sets of horizontally smoothed pixel data PHS_1 to PHS_M according to Y sets of pixel data in each of the I sets of vertically enlarged and smoothed pixel row data PLVSR_1 to PLVSR_I. Thereafter, as shown in the step (c4), the horizontal interpolation unit 14d performs the horizontal interpolation operation according to the M sets of horizontally smoothed pixel data PHS_1 to PHS_M to obtain the J sets of enlarged and smoothed pixel data in each of the I sets of smoothed and enlarged pixel row data PLVSR_1 to PLVSR_M, and thus correspondingly obtain the I sets of smoothed and enlarged pixel row data PLSR_1 to PLSR_I.

Figure 8:
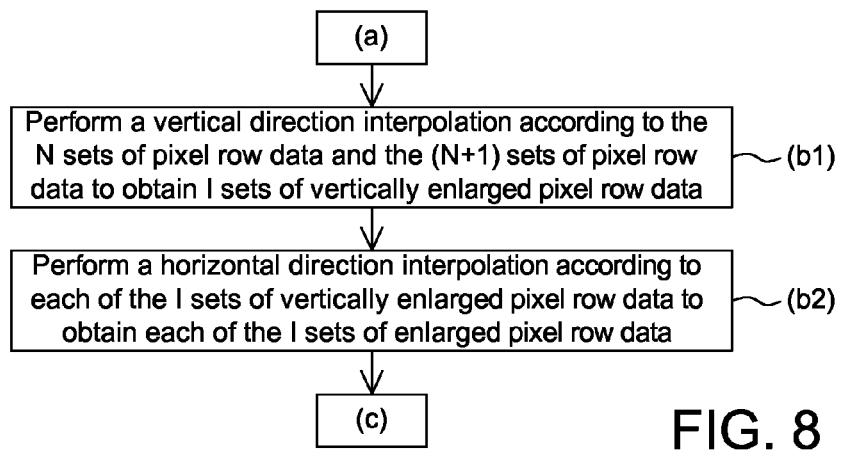
FIG. 8 is a detailed flow chart showing the step (b) in FIG. 6.

FIG. 8 is a detailed flow chart showing the step (b) in FIG. 6. For example, the step (b) includes steps (b1) and (b2). First, as shown in the step (b1), the vertical interpolation unit 12a performs the vertical interpolation operation according to the (N+1) sets of pixel row data PR_1 to PR_N+1 to obtain the I sets of vertically enlarged pixel row data. Next, as shown in the step (b2), the horizontal interpolation unit 12b performs the horizontal interpolation operation according to each of the I sets of vertically enlarged pixel row data to obtain the J sets of enlarged pixel data in each of the I sets of enlarged pixel row data PLR_1 to PLR_I.

Figure 9:
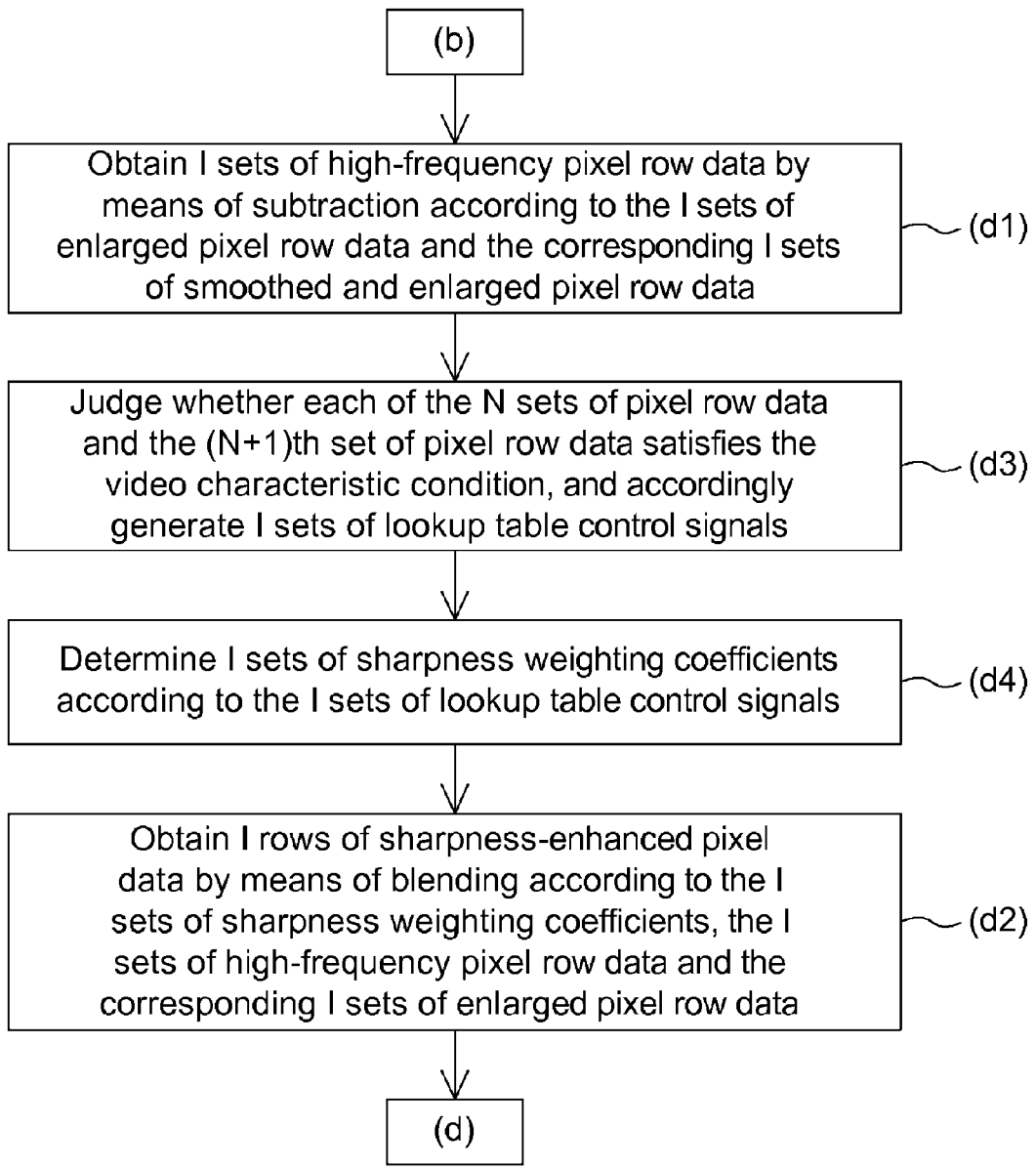
FIG. 9 is a detailed flow chart showing the step (d) in FIG. 7.

FIG. 9 is a detailed flow chart showing the step (d) in FIG. 7. For example, the step (d) includes steps (d1) and (d2). First, as shown in the step (d1), the operating unit 16a obtains the I sets of high-frequency pixel row data PHP_1 to PHP_I, respectively indicating high-frequency components of the I sets of enlarged pixel row data PLR_1 to PLR_I, by means of subtraction according to the I sets of enlarged pixel row data PLR_1 to PLR_I and the corresponding I sets of smoothed and enlarged pixel row data PLSR_1 to PLSR_I. Next, as shown in the step (d2), the blending unit 16b obtains the I rows of sharpness-enhanced pixel data PSR_1 to PSR_I by means of blending according to the I sets of sharpness weighting coefficients W1 to WI, the I sets of high-frequency pixel row data PHP_1 to PHP_I and the corresponding I sets of enlarged pixel row data PLR_1 to PLR_I.

In one example, the method further includes steps (d3) and (d4) between the steps (d1) and (d2). As shown in the step (d3), the video classifying unit 16c judges whether each of the (N+1) sets of pixel row data PR_1 to PR_N+1 satisfies the video characteristic condition, and accordingly generates the I sets of lookup table control signals LU1 to LUN. Next, as shown in the step (d4), the lookup table unit 16d determines the I sets of sharpness weighting coefficients W1 to WI according to the I sets of lookup table control signals LU1 to LUN to perform the selective sharpness-enhancement operation on the I sets of enlarged pixel row data PLR_1 to PLR_I.

The video processing circuit according to the embodiment of the invention uses the video scaling circuit and the video smoothing circuit, disposed in parallel, to respectively finish the video enlarging operation and the video enlarging and smoothing operation according to buffered original video data in the same linear buffer. The video processing circuit according to the embodiment of the invention further utilizes the blending circuit to obtain the high-frequency component data and the sharpness-enhanced pixel row data according to the enlarged video data and the enlarged and smoothed video data. Thus, compared with the conventional video sharpness enhancing circuit, the video processing circuit of the invention has the advantages of using the fewer linear buffers and having the lower cost.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video processing circuit for enlarging and enhancing sharpness of input video data, the video processing circuit comprising:

N linear buffers for respectively buffering N sets of pixel row data of the input video data, wherein N is a natural number;

a video scaling circuit for generating I sets of enlarged pixel row data by means of interpolation according to the buffered N sets of pixel row data in the N linear buffers and a currently inputted (N+1)th set of pixel row data, wherein I is a natural number greater than N;

a video smoothing circuit for generating I sets of smoothed and enlarged pixel row data according to the buffered N sets of pixel row data in the N linear buffers and the (N+1)th set of pixel row data; and a blending circuit for obtaining I sets of high-frequency pixel row data according to the I sets of enlarged pixel row data and the I sets of smoothed and enlarged pixel row data, and obtaining I sets of sharpness-enhanced pixel row data by means of blending according to the I sets of enlarged pixel row data and the I sets of high-frequency pixel row data.

2. The video processing circuit according to claim 1, wherein the video smoothing circuit comprises:

(N−1) vertical smoothing units, each of which generates one set of vertically smoothed pixel row data according to X sets of pixel row data in the N sets of pixel row data and the (N+1)th set of pixel row data, wherein X is a natural number greater than 1; and a vertical interpolation unit for performing a vertical interpolation operation according to the (N−1) sets of vertically smoothed pixel row data to obtain I sets of vertically enlarged and smoothed pixel row data.

3. The video processing circuit according to claim 2, wherein each of the I sets of vertically enlarged and smoothed pixel row data comprises M sets of pixel data, M is a natural number greater than 1, and the video smoothing circuit further comprises:

M horizontal smoothing units for generating one set of horizontally smoothed pixel data according to Y sets of pixel data in each of the I sets of vertically enlarged and smoothed pixel row data, wherein Y is a natural number greater than 1; and a horizontal interpolation unit for performing a horizontal interpolation operation to obtain J sets of enlarged and smoothed pixel data in each of the I sets of smoothed and enlarged pixel row data according to M sets of the horizontally smoothed pixel data, wherein J is a natural number greater than 1.

4. The video processing circuit according to claim 1, wherein the video scaling circuit comprises:

a vertical interpolation unit for performing a vertical interpolation operation according to the N sets of pixel row data and the (N+1)th set of pixel row data to obtain I sets of vertically enlarged pixel row data; and a horizontal interpolation unit for performing a horizontal interpolation operation according to each of the I sets of vertically enlarged pixel row data to obtain J sets of enlarged pixel data in each of the I sets of enlarged pixel row data, wherein J is a natural number greater than 1.

5. The video processing circuit according to claim 1, wherein the blending circuit comprises:

an operating unit for obtaining the I sets of high-frequency pixel row data, respectively indicating high-frequency components of the I sets of enlarged pixel row data by means of subtraction according to the I sets of enlarged pixel row data and the corresponding I sets of smoothed and enlarged pixel row data; and a blending unit for obtaining the I sets of sharpness-enhanced pixel row data by means of blending according to I sets of sharpness weighting coefficients, the I sets of high-frequency pixel row data and the corresponding I sets of enlarged pixel row data.

6. The video processing circuit according to claim 5, wherein the blending circuit further comprises:

a video classifying unit for judging whether each of the N sets of pixel row data and the (N+1)th set of pixel row data satisfies a video characteristic condition and accordingly generating I sets of lookup table control signals; and a lookup table unit for determining the I sets of sharpness weighting coefficients according to the I sets of lookup table control signals, respectively, to perform a selective sharpness-enhancement operation on the I sets of enlarged pixel row data.

7. A video processing method for enlarging and enhancing sharpness of input video data, the video processing method comprising the steps of:

respectively buffering N sets of pixel row data of the input video data in N linear buffers, wherein N is a natural number;

generating I sets of enlarged pixel row data by means of interpolation according to the buffered N sets of pixel row data in the N linear buffers and a currently inputted (N+1)th set of pixel row data, wherein I is a natural number greater than N;

generating I sets of smoothed and enlarged pixel row data according to the buffered N sets of pixel row data in the N linear buffers and the (N+1)th set of pixel row data; and obtaining I rows of sharpness-enhanced pixel data by means of blending according to the I sets of enlarged pixel row data and the I sets of smoothed and enlarged pixel row data.

8. The method according to claim 7, wherein the step of generating the I sets of smoothed and enlarged pixel row data comprises:

generating (N−1) sets of vertically smoothed pixel row data according to X sets of pixel row data of the N sets of pixel row data and the (N+1)th set of pixel row data, wherein X is a natural number greater than 1; and performing a vertical interpolation operation according to the (N−1) sets of vertically smoothed pixel row data to obtain I sets of vertically enlarged and smoothed pixel row data.

9. The method according to claim 8, wherein the step of generating the I sets of smoothed and enlarged pixel row data comprises:

generating M sets of horizontally smoothed pixel data according to Y sets of pixel data in each of the I sets of vertically enlarged and smoothed pixel row data, wherein M and Y are natural numbers greater than 1; and performing a horizontal interpolation operation according to the M sets of horizontally smoothed pixel data to obtain J sets of enlarged and smoothed pixel data in each of the I sets of smoothed and enlarged pixel row data, wherein J is a natural number greater than 1.

10. The method according to claim 7, wherein the step of generating the I sets of enlarged pixel row data comprises:

performing a vertical interpolation operation according to the N sets of pixel row data and the (N+1)th set of pixel row data to obtain I sets of vertically enlarged pixel row data; and performing a horizontal interpolation operation according to each of the I sets of vertically enlarged pixel row data to obtain J sets of enlarged pixel data in each of the I sets of enlarged pixel row data, wherein J is a natural number greater than 1.

11. The method according to claim 7, wherein the step of obtaining the I sets of sharpness-enhanced pixel row data by means of blending comprises:

obtaining I sets of high-frequency pixel row data, respectively indicating high-frequency components of the I sets of enlarged pixel row data, by means of subtraction according to the I sets of enlarged pixel row data and the corresponding I sets of smoothed and enlarged pixel row data; and obtaining the I sets of sharpness-enhanced pixel row data by means of blending according to I sets of sharpness weighting coefficients, the I sets of high-frequency pixel row data and the corresponding I sets of enlarged pixel row data.

12. The method according to claim 11, wherein the step of obtaining the I sets of sharpness-enhanced pixel row data by means of blending further comprises:

judging whether each of the N sets of pixel row data and the (N+1)th set of pixel row data satisfies a video characteristic condition, and accordingly generating I sets of lookup table control signals; and determining the I sets of sharpness weighting coefficients according to the I sets of lookup table control signals to perform a selective sharpness-enhancement operation on the I sets of enlarged pixel row data.

* * * * *